March 14, 1933. A. L. PARKER 1,901,820
SOLDER FITTINGS AND METHOD OF SOLDERING
Filed Dec. 22, 1931
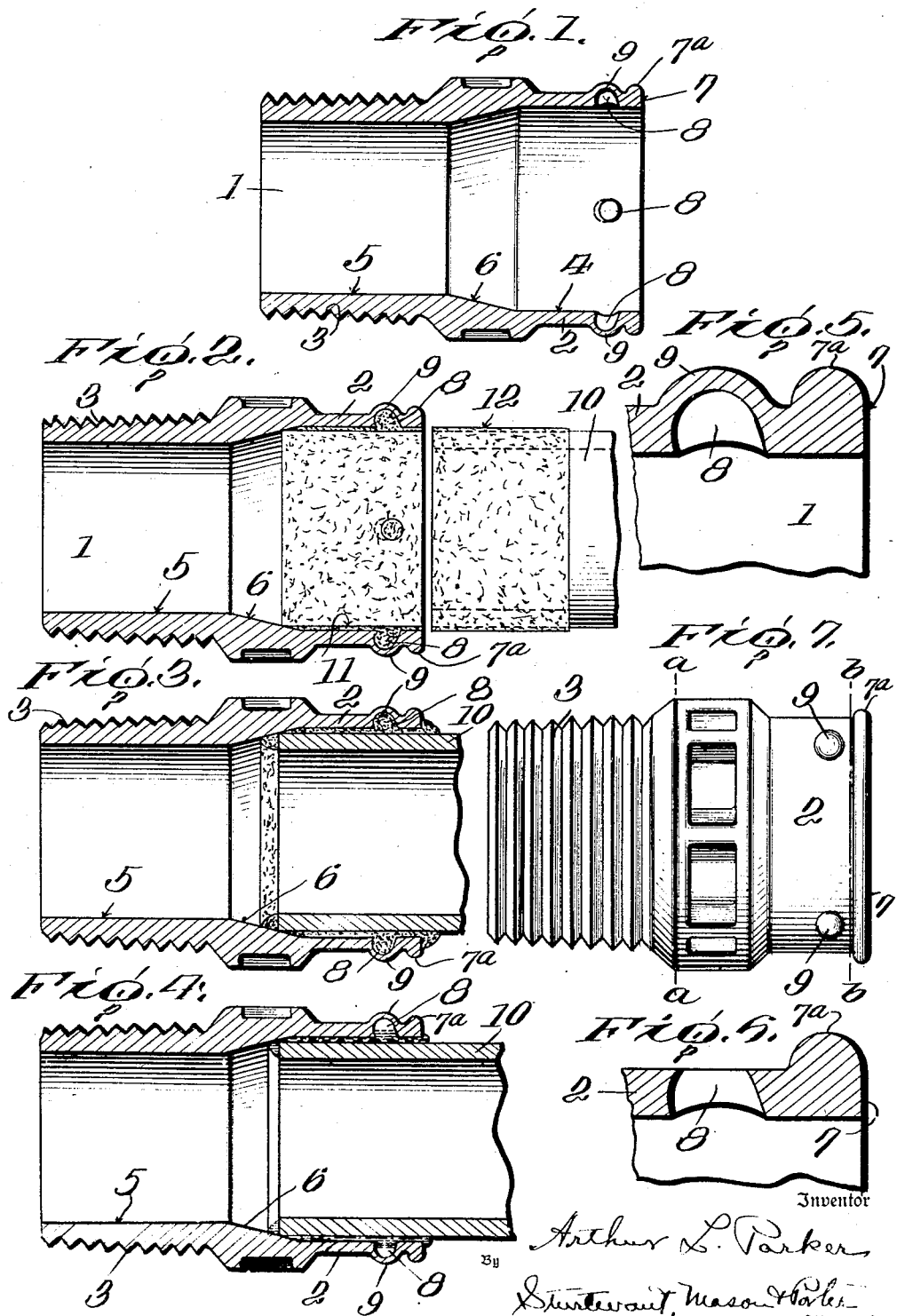
Inventor
Arthur L. Parker
By Sturtevant, Mason & Porter
Attorneys Patented Mar. 14, 1933

1,901,820

UNITED STATES PATENT OFFICE

ARTHUR L. PARKER, OF CLEVELAND, OHIO

SOLDER FITTINGS AND METHOD OF SOLDERING

Application filed December 22, 1931. Serial No. 582,594.

The invention relates to new and useful improvements in solder fittings and the method of attaching the solder fittings to metal parts.

An object of the invention is to provide a solder fitting adapted to receive a metal part, which fitting is provided with means for positioning the part relative to the fitting so as to form a solder bonding space which is substantially uniform circumferentially of the fitting.

A further object of the invention is to provide a fitting of the above type wherein the surface of the fitting adjacent the part to be joined thereto, is provided with pockets for receiving the bonding material applied to the inner surface of the sleeve prior to the assembling of the fitting and the parts to be joined, and providing a reserve of bonding material in excess of the quantity normally required to fill the space between the fitting and tube.

A still further object of the invention is to provide a fitting of the above type wherein the metal of the fitting closes the inner end of the pocket and is projected above the face of the fitting so that the removal of the projecting metal will open the pocket to the outer face of the fitting.

A still further object of the invention is to provide a method of attaching solder fittings to metal parts wherein the metal bonding material is applied to the fitting in a viscous or semi-fluid condition and is retained on the fitting by an adhesive incorporated in the bonding material.

A still further object of the invention is to provide a method of attaching solder fittings to metal parts wherein visible means on the exterior of the fitting is so changed in appearance by the heat sufficient to melt the bonding material as to indicate and insure the proper bonding of the fitting and metal part throughout the entire extent of the bond.

In the drawing which shows by way of illustration one embodiment of the invention—

Figure 1 is a sectional view through the solder fitting embodying my improvements prior to the attaching of the same to a metal part;

Fig. 2 is a similar view showing a semi-fluid or viscous bonding material applied thereto prior to the inserting of the metal part which is to be soldered to the fitting;

Fig. 3 is a view showing the metal part inserted preparatory to the applying of heat for the melting of the bonding material to bond the metal part to the fitting;

Fig. 4 is a view showing the final bonding of the metal part to the fitting;

Fig. 5 is an enlarged sectional view through a portion of the fitting showing the shaping of the metal parts in the forming of the recesses therein which are to receive a portion of the binding material;

Fig. 6 is a view showing the cutting away of the projecting portion closing the end of the pocket for the opening of the pocket at the outer face of the fitting;

Fig. 7 is a side view of the fitting showing the region after the coating is applied of the character to indicate whether sufficient heat has been applied to the fitting for the bonding of the fitting to the metal part.

The invention is directed to a solder fitting to which a metal part is secured by a bonding solder. The fitting is especially adapted for the attachment of tubes, rods or the like, and includes a sleeve which is adapted to receive the tube end to which it is to be joined. The sleeve at the receiving end and throughout substantially the entire region where the bonding is to be placed, is of slightly larger diameter than the tube or rod, so as to provide an annular space between the tube and the fitting for the bonding material. The sleeve is provided on the interior thereof with means for centering the tube in the space so as to provide a uniform circumferential space for the solder bond. This is accomplished by tapering the wall of the sleeve so that the end of the tube engaging the tapered surface will be centered thereby in said space. The sleeve of the solder fitting is also provided with spaced pockets or recesses. These pockets or recesses are preferably formed by drilling from the inner surface of the sleeve outward, and with a drill properly conditioned so as to form in the metal a projecting portion at the outer end of the pocket which completely closes the pocket. The solder bond is applied in the form of a semifluid or viscous mixture, consisting of granular solder and a flux adhesive, which not only joins the parts, but will cause the bonding material to adhere to the metal part. It is preferably applied by the operator just before assembling the parts, and may be done by rubbing the semi-fluid bonding material on the inner surface of the sleeve, filling the pockets or recesses so as to provide a surplus of bonding material to aid in the proper bonding of the metal parts. Heat is applied to the fitting after the parts are assembled for melting the solder and thus joining the metal parts by a solder bond. In order to insure that sufficient heat is applied to all parts of the solder fitting for effecting a bonding of the parts, a coating is applied to the outer face of the fitting, preferably consisting of a colored lacquer and a metal which melts at a temperature sufficiently high to insure the supplying of the required amount of heat to the fitting to bring about a melting of the solder. When this metal in the lacquer coating melts, it changes the color of the coating, and after heat has been applied, if it is found that the coating throughout has changed its color appearance, this is an indication that sufficient heat has been applied to the fitting to bring about a melting of the solder and the bonding of the metal parts.

Referring more in detail to the drawing, the invention will probably be better understood. Only one form of fitting is illustrated, it being understood that the fitting may be in various forms, so as to accommodate various shapings of metal parts. The fitting is illustrated in the drawing at 1 and consists of a sleeve portion 2 which receives the tube end or rod to which the fitting is to be joined, and a threaded portion 3 which may be joined to another part by a threaded connection. The invention has to do particularly with the construction of the sleeve end of the fitting. The sleeve end of the fitting has the inner wall 4 thereof of a larger diameter than the inner wall 5. Between the wall 4 and the wall 5 is a tapered wall 6.

Located back from the end 7 of the fitting is a pocket or recess 8. This pocket or recess 8 is formed in the fitting by drilling from the inside thereof, and is formed by a drill which is so provided that during the drilling operation, the metal at 9 will be forced to cup outward without being broken through. This outward cupped portion 9 projects beyond the outer face of the sleeve. It closes the pocket. There may be several of these pockets formed in the fitting. This completes the construction of the fitting. As stated, the fitting may be of other forms, and may be used for joining two tubes or two rods, or metal parts of any character where it is desired to join the part to the fitting by a solder bond.

In Fig. 2 of the drawing, the metal part to be joined to the fitting is shown in the form of a tube 10. The exterior diameter of this tube 10 is less than the interior diameter of the surface 4. This leaves between the inner surface of the sleeve and the outer surface of the tube, an annular space for the solder bond. When the tube is inserted in the fitting, the inner end of the tube engages the tapered surface 6 and this will cause the tube to be centered in the space, thus producing a substantially uniform circumferential space between the fitting and the tube.

Prior to the inserting of the tube in the fitting, the solder bonding material is applied to the parts to be joined. It is preferably applied to the inner surface of the sleeve and also to the outer surface of the tube which is to be inserted in the sleeve, as indicated at 11 and 12, respectively. I prefer to use a semi-fluid or viscous bonding material consisting of granular solder, that is, finely ground solder, and a flux with an adhesive which may be added to the solder and flux when the flux is not of itself sufficiently adhesive. Any suitable paste or adhesive may be used. It is essential, however, that the flux, solder and adhesive, when combined, shall produce a semi-fluid mass which may be readily applied to the inner surface of the fitting. The bonding material thus formed is applied, preferably at the time when the tube is to be attached, to the inner surface of the sleeve, filling the pockets 8 with the bonding material. When the tube is inserted, the end of the tube engaging the bonding material on the inner surface of the sleeve will roll the same into a bead at the end of the tube. The end of the sleeve engaging the coating on the outer face of the tube will roll the same into a bead at the end of the sleeve. Still there is left bonding material between the sleeve and the tube.

When the tube is inserted, the end thereof contacts with the tapered or wedge-shaped portion within the sleeve and this not only centers the tube in the sleeve but will cause the tube to be frictionally gripped by the fitting which greatly aids in the forming of the solder coupling. For example, if the fitting is at the lower end of a tube, it will be held in place by this wedging grip of the fitting on the tube. After the tube has been placed, heat is applied to the fitting for the purpose of melting the solder. As noted, there is a bead of the bonding material at the inner end of the tube, and this will insure the firm bonding of the inner end of the tube to the fitting and prevent any possible leaks between the tube and the fitting. The sleeve will also be firmly bonded to the tube at the outer end of the sleeve. The pockets contain a reserve of bonding material in excess of the quantity normally required to fill the space between the fitting and the sleeve so that there is a firm bonding of the fitting to the sleeve throughout the entire bonding region. If, for any reason, an efficient bonding of the tube to the fitting is not accomplished, the projecting portion 9 of the metal in the fitting may be filed away as indicated in Fig. 6, thus opening the pocket to the outer face of the fitting and permitting molten solder to be inserted through said opening for the completing of the solder bond.

In order to aid in determining whether sufficient heat has been applied all the way around the fitting to effect a solder bond, the fitting is preferably coated in the region between the lines a—a and b—b (Fig. 7) with a mixture of some form of colored lacquer, and a metal which has a melting point higher than that of solder. Ground antimony has been found efficient for this purpose. This coating is applied to the fitting during the construction thereof. The coating may be applied in the form of a band extending all the way from the line a—a to the line b—b, or it may be applied in the form of strips or otherwise, the essential feature being that the coating shall be distributed throughout the entire solder bonding region. The lacquer is given some distinctive color, as for example, red. After the parts are assembled, heat is applied to melt the solder bond, and the heat necessary to melt the solder bond will also melt the antimony and change the appearance or color of the coating to a dark reddish brown. When the coating all the way around the fitting has changed its appearance through the melting of the antimony therein, then it is assured that sufficient heat has been applied to the fitting all the way around the same for melting the solder to complete the solder bond. The sleeve of the fitting at the outer end thereof is formed with a circular projecting bead 7a. Said bead is adapted to retard the heat radiation at the open end of the sleeve and insures the cooling and setting of the solder bond from the inner end of the seal outwardly.

It will be understood that from certain aspects of the invention, the pockets or recesses 8 may be otherwise disposed and made from that described in detail, and possibly these pockets may be omitted. It will also be understood that the tapered portion 6 may extend substantially to the outer end of the sleeve, it being essential, however, that proper space is left for the bonding material, and that the tapered surface shall extend inward so as to contact with the tube end for centering the same in the sleeve. It will be understood that other ways may be used for centering the tube. It is essential, however, that the tube be centered in the space so as to provide a substantially uniform circumferential space between the tube and the fitting which results in a uniform thickness of bond between the parts. It will be understood that the coating which indicates that sufficient heat has been applied to the fitting to bring about a melting of the solder throughout the entire extent of the bonding region, may be otherwise made and applied to the fitting. It is essential, however, that the coating shall be subjected to the heat which melts the solder and of a character to have its appearance changed when sufficient heat has been applied to effect bonding.

Having thus described the invention, what I claim as new and desire to secure by Letters-Patent, is—

1. A solder fitting for metal tubes including a sleeve adapted to receive the end of the tube, said sleeve in the region of the tube end being dimensioned so as to provide a uniform clearance space only sufficient to permit the free insertion of the tube in said sleeve, said sleeve at the inner end of the clearance space being tapered inwardly and dimensioned so that the end of the tube contacting with said tapered portion will be frictionally gripped and held centered in said sleeve, the inner surface of said sleeve having applied thereto a viscous solder bonding mixture which adheres to the wall of the sleeve and contains sufficient solder and flux for effecting a solder bond when heat is applied to the fitting.

2. A solder fitting for metal tubes including a sleeve adapted to receive the end of the tube, said sleeve in the region of the tube end being dimensioned so as to provide a uniform clearance space only sufficient to permit the free insertion of the tube in said sleeve, said sleeve at the inner end of the clearance space being tapered inwardly and dimensioned so that the end of the tube contacting with said tapered portion will be frictionally gripped and held centered in said sleeve, the inner surface of said sleeve having applied thereto a viscous solder bonding mixture which adheres to the wall of the sleeve and contains sufficient solder and flux for effecting a solder bond when heat is applied to the fitting, said sleeve having pockets formed on the inner wall thereof in the region of the solder bond for storing surplus solder bonding material.

3. A solder fitting for metal tubes including a sleeve adapted to receive the end of the tube, said sleeve in the region of the tube end being dimensioned so as to provide a uniform clearance space only sufficient to permit the free insertion of the tube in said sleeve, said sleeve at the inner end of the clearance space being tapered inwardly and dimensioned so that the end of the tube contacting with said tapered portion will be frictionally gripped and held centered in said sleeve, the inner surface of said sleeve having applied thereto a viscous solder bonding mixture which adheres to the wall of the sleeve and contains sufficient solder and flux for effecting a solder bond when heat is applied to the fitting, said sleeve at the outer end thereof being formed with a circumferentially projecting bead adapted to retard the heat radiation at the open end of the sleeve and insure the cooling and setting of the solder bond from the inner end of the seal outwardly.

4. A solder fitting for metal tubes including a sleeve adapted to receive the end of the tube, said sleeve in the region of the tube being dimensioned so as to provide a uniform clearance space only sufficient to permit the free insertion of the tube in said sleeve, said sleeve at the inner end of the clearance space being constructed so as to grip and center the tube in said sleeve, solder bonding material within said sleeve, and a coating on the exterior of the sleeve adapted to change in appearance when sufficient heat has been applied to the fitting for melting the solder bond.

5. A solder fitting for metal tubes including a sleeve adapted to receive the end of the tube, said sleeve in the region of the tube being dimensioned so as to provide a uniform clearance space only sufficient to permit the free insertion of the tube in said sleeve, a solder bonding material within said sleeve, and a coating on the exterior of the sleeve adapted to change in appearance when sufficient heat has been applied to the sleeve for melting the solder bond within the sleeve.

6. The method of attaching solder fittings to tubes comprising forming a sleeve fitting adapted to receive the end of the tube which is to be attached thereto, and dimensioning said sleeve fitting so as to provide a uniform clearance space only sufficient to permit the free insertion of the tube in said sleeve, applying to the inner surface of the sleeve of the fitting a viscous adhering coating containing solder and flux, subsequently inserting the tube in the sleeve and centering said tube in said sleeve, and applying heat sufficient to melt the solder and bond the tube to the fitting.

7. The method of attaching solder fittings to tubes comprising forming a sleeve fitting adapted to receive the end of the tube which is to be attached thereto and dimensioning said sleeve fitting so as to provide a uniform clearance space only sufficient to permit the free insertion of the tube in said sleeve, and a tapered surface at the inner end of the clearance space which is so dimensioned as to grip and center the tube in the clearance space in said sleeve, applying to the inner surface of the sleeve of the fitting a viscous adhering coating containing solder and flux, subsequently inserting the tube into said sleeve into gripping contact with said tapered surface, and applying heat sufficient to melt the solder and bond the tube to the fitting.

8. A solder fitting for metal tubes including a sleeve adapted to receive the end of the tube, said sleeve in the region of the tube end being dimensioned so as to provide a uniform clearance space only sufficient to permit the free insertion of the tube in said sleeve, said sleeve at the inner end of the clearance space being tapered inwardly and dimensioned so that the end of the tube contacting with said tapered portion will be frictionally gripped, centered, and said tube and sleeve firmly held assembled, and a solder bonding mixture applied to said sleeve prior to the assembling of said parts for effecting a solder bond when heat is applied to the sleeve.

In testimony whereof, I affix my signature.
ARTHUR L. PARKER.